3,553,857
ADHESION OF ELASTOMERIC MATERIALS

Donald Pettit, Isham, Frederick Brian Blackwell, Barton Seagrave, and Alan Reginald Carter, Kettering, England, assignors to The Shoe and Allied Trades Research Association, Kettering, England
No Drawing. Filed Aug. 18, 1969, Ser. No. 851,080
Claims priority, application Great Britain, Aug. 22, 1968, 40,166/68; Apr. 10, 1969, 18,589/69
Int. Cl. A43b 13/06; A43d 00/00
U.S. Cl. 36—32                    9 Claims

ABSTRACT OF THE DISCLOSURE

A sole unit of elastomeric soling material other than thermoplastic rubber and carrying a dried film of a solvent-based polyurethane or polychloroprene adhesive superimposed on a halogenated surface of the sole unit.

DESCRIPTION OF INVENTION

This invention relates to the adhesion of elastomeric materials, and in particular to the adhesion of elastomeric materials such as are employed for shoe soling.

It is known that the receptiveness of elastomeric soling materials (e.g. natural rubber, styrene-butadiene rubber, nitrile rubber, thermoplastics rubber and mixtures and blends of these), towards adhesives of, e.g., polychloroprene and polyurethane types, is often unsatisfactory. Modern methods of shoemaking frequently employ stuck-on soles, as opposed to the traditional stitched-on leather sole and hence the problem of ensuring good adhesion of the sole to the upper is of considerable importance.

We have now discovered that sole units of elastomeric soling materials are greatly improved in receptiveness to adhesives, in particular polychloroprene or polyurethane-based adhesives, by a preliminary surface halogenation treatment. Preferred halogenation treatments are bromination, chlorination. Bromination can be carried out for example, by wiping the sole unit with a solution of bromine in carbon tetrachloride; chlorination can be carried out by use of an aqueous solution of sodium hypochlorite and hydrochloric acid, or by exposure to chlorine vapour. Some bromination methods involve the presence of irritant concentrations of bromine vapour; if, however, aqueous solutions of bromine are the method of choice the bromine vapour concentration may be reduced by dissolving salts such as ammonium chloride and potassium bromide in the bromine solution.

Soling materials which provide successful results when treated by the process of the present invention include natural rubber and vulcanized styrene-butadiene rubber. Styrene-butadiene rubber is commonly known in the trade as SBR rubber.

It has been found in fact that without any mechanical treatment solvent-based polychloroprene and polyurethane adhesives could provide bonds stronger than the rubbers themselves, when the rubbers had been given preliminary surface halogenation treatments as described above.

Thus the present invention provides in a general sense a shoemaking process comprising subjecting a sole unit of elastomeric soling material (as hereinbefore defined) to a surface halogenation treatment, applying a solvent-based polyurethane or polychloroprene adhesive to the treated surface and then securing the shoe upper and/or other shoe component to the adhesive-coated surface of the sole unit.

By the term elastomeric soling material there is meant herein those elastomeric materials conventionally used in the shoe industry for shoe soles, examples of which are the natural rubber and SBR rubber previously mentioned, but excluding thermoplastic rubber (TPR).

Whilst the process is essentially one of general application it will be appreciated that not all rubbers will respond equally to all types of halogenation treatment to provide improved receptiveness to all adhesives. Generally, chlorination or bromination more frequently provides improved receptiveness to polyurethane-based adhesives than to polychloroprene-based adhesives, although vulcanized natural rubber shows substantial gains in strength of adhesion with polychloroprene-based adhesives.

This preliminary halogenation treatment can be usefully applied also in the manufacture of pre-cemented sole units. Specifically, the sole unit is halogenated and subsequently coated with the solvent-based adhesive. On evaporation of the solvent and drying of the adhesive coating, a pre-cemented sole unit is obtained which can be stored and used at a later time when desired, so enabling improved flexibility in actual shoe production.

In this aspect, the present invention provides a sole unit of elastomeric soling material (as hereinbefore defined) and carrying a dried film of a solvent-based polyurethane or polychloroprene adhesive superimposed on a halogenated surface of the sole unit.

The following examples provide test results illustrating the advantage of the present invention as applied to a variety of soling materials, adhesives and upper material adherends.

EXAMPLE 1

A number of typical soling rubbers were wiped with a 30% w./v. solution of bromine in carbon tetrachloride. Two were found to show substantial gains in bond strength using a commercial polyurethane adhesive sold under the trade name Unigrip No. 8200 to bond to plasticised polyvinylchloride, the results being given in Table I.

TABLE I

| | Bond strength, lbs./in. | |
|---|---|---|
| Soling rubber | Untreated | Brominated |
| Silicate-filled, vulcanised SBR/high-styrene resin blend. | 1 AR | 60 RT. |
| Vulcanised SBR | 1 AR | 20 partial RT. |

NOTE:
AR=adhesion to rubber failure.
RT=rubber tearing.

EXAMPLE 2

A number of typical soling rubbers (g), (h), (i), (j) were exposed to chlorine vapour for 2 hours, and bonded subsequently to a plasticised polyvinylchloride coated fabric using the commercial polyurethane adhesive of Example 1. The bonds were tested and compared with similar bonds prepared with the untreated rubbers, the results being given in Table II.

TABLE II

| | Bond strength, lbs./in. | |
|---|---|---|
| Soling rubber | Untreated | Chlorinated |
| Silicate-filled vulcanised SBR/high styrene resin blend. (Vitasole (Sussex) Ltd. Resin Rubber S249/L) (g). | 10 AR | 25 SR. |
| Vulcanised natural rubber (Vitasole (Sussex) Ltd. Mix 170) (h). | 6 AR | 59 partial RT. |
| Silica-filled vulcanised SBR (Corrugated 938, Long and Hambly Ltd.) (i). | 0 AR | 75 RT. |
| Vulcanised SBR (Vitasole (Sussex) Ltd. No. S1805) (j). | 1 AR | 29 partial RT. |

None of the above rubbers were mechanically prepared but similar improvements were made to freshly split surfaces of the rubbers when chlorinated and bonded with the adhesive.

EXAMPLE 3

A number of typical soling rubbers ((g), (h), (i), (j) of Example 2) were chlorinated by immersing them in a solution of acidified sodium hypochlorite of the follownig composition:

| | Ml. |
|---|---|
| NaOCl aq. (2.5% available chlorine w./v.) | 10 |
| 5 N HCl aq. | 7 |
| $H_2O$ | 100 |

Bonds to plasticised polyvinylchloride coated fabrics were then prepared using the adhesive of Example 1. The strengths of the bonds are given below in Table III and may be directly compared with the untreated bonds whose strengths are given in Example 2.

Soling rubber:

| | Bond strength lbs./in. chlorinated surfaces |
|---|---|
| (g) | 34 RT. |
| (h) | 45 partial RT. |
| (i) | 79 PT. |
| (j) | 80 RT. |

EXAMPLE 4

A number of commercial soling rubbers were treated as in Example 3 by immersion in an acidified sodium hypochlorite solution, washed and allowed to dry.

These treated rubbers were then bonded to leather using a commercial polychloroprene-based adhesive sold under the trade name Unigrip No. 6090, and tested together with control joints made from untreated rubbers; the two rubbers referred to in Table IV below gave good improvements in bond strength:

TABLE IV

| | Bond strength, lbs./in. | |
|---|---|---|
| Soling rubber | Untreated | Chlorinated |
| Vulcanised natural rubber composition (h). | 0 AR | 31 partial AR. |
| Vulcanised natural rubber SBR blend (high quality black rubber as used in "Commando" soles, Itshide Rubber Co.). | 0 AR | 30 mainly AR. |

When similar tests were conducted on the same rubbers after freshly splitting the following results, in Table V, were obtained:

TABLE V

| | Bond strength, lbs./in. | |
|---|---|---|
| Soling rubber | Untreated | Chlorinated |
| Vulcanised natural rubber composition | 26 AR | 40 mainly RT. |
| Vulcanised natural rubber/SBR blend | 24 AR | 35 partial AR. |

EXAMPLE 5

Specimens of microcellular resin rubber, such as is used as a soling rubber, with freshly scoured surface were respectively treated by exposure to $Cl_2$ vapour (5% v./v.) for 2 hours, and immersion in acidified sodium hypochlorite (0.1% available $Cl_2$, w/v.), washing and allowing to dry.

The treated specimens were then bonded to a plasticized polyvinylchloride coated fabric using the same polyurethane adhesive, Unigrip 8200, as in Example 1. The joints were tested against a control joint made from another specimen of the rubber, with freshly scoured surface but untreated. The improvement in bond strength attained is illustrated by the results in the following Table VI.

TABLE VI

| | Bond strength, lbs./in. | | |
|---|---|---|---|
| Soling rubber | Untreated | Hypochlorite treatment | $Cl_2$ vapour treatment |
| Microcellular resin rubber | 4 AR | 26 R | 18 SR |

NOTE.—R=rubber tore; SR=surface rubber tearing.

In certain instances the receptiveness of the elastomeric scling material towards the adhesive can be improved still further by a preliminary treatment of the surface of the soling material, before halogenation, with an acid solution as described in our earlier British specification No. 1,021,075, a 1% solution of lactic acid in methyl ethyl ketone being preferred.

The present invention includes also the eventual soled shoes obtained from the surface-treated elastomeric materials.

We claim:

1. A shoemaking process comprising subjecting a sole unit of elastomeric soling material other than thermoplastic rubber to a surface halogenation treatment, applying a solvent-based adhesive of the group consisting of polyurethane and polychloroprene to the treated surface and then securing a shoe upper component to the adhesive-coated surface of the sole unit.

2. A shoemaking process according to claim 1 wherein the sole unit is of natural rubber.

3. A shoemaking process according to claim 1 wherein the sole unit is of vulcanised styrene-butadiene rubber.

4. A shoemaking process according to claim 1 wherein the surface halogenation is carried out by molecular bromine.

5. A shoemaking process according to claim 1 wherein the surface halogenation is carried out by molecular chlorine.

6. A shoemaking process according to claim 1 wherein the surface halogenation is carried out by hypochlorite ion.

7. A shoemaking process according to claim 1 wherein the shoe upper and/or other shoe component is of leather.

8. A shoemaking process according to claim 1 wherein the shoe upper component is of plasticized polyvinylchloride.

9. A sole unit of elastomeric soling material other than thermoplastic rubber and carrying a dried film of a solvent-based adhesive of the group consisting of polyurethane and polychloroprene superimposed on a halogenated surface of the sole unit.

References Cited

UNITED STATES PATENTS

| 1,714,943 | 5/1929 | Brockman | 12—146 |
| 3,116,501 | 1/1964 | Markevitch | 12—142 |
| 3,362,036 | 1/1968 | Swan et al. | 12—142 |

PATRICK D. LAWSON, Primary Examiner

U.S. Cl. X.R.

12—146